US008194716B2

(12) United States Patent
Abou Rjeily

(10) Patent No.: US 8,194,716 B2
(45) Date of Patent: Jun. 5, 2012

(54) SPACE-TIME CODING METHOD FOR A MULTI-ANTENNA COMMUNICATION SYSTEM OF THE UWB PULSE TYPE

(75) Inventor: Chadi Abou Rjeily, Zahle Mouallaka (LB)

(73) Assignee: Commissariat a l'Energie Atomique, Paris (FR)

( * ) Notice: Subject to any disclaimer, the term of this patent is extended or adjusted under 35 U.S.C. 154(b) by 376 days.

(21) Appl. No.: 12/518,672

(22) PCT Filed: Dec. 21, 2007

(86) PCT No.: PCT/FR2007/052600
§ 371 (c)(1),
(2), (4) Date: Jun. 11, 2009

(87) PCT Pub. No.: WO2008/087343
PCT Pub. Date: Jul. 24, 2008

(65) Prior Publication Data
US 2010/0014561 A1    Jan. 21, 2010

(30) Foreign Application Priority Data

Dec. 22, 2006 (FR) .................................. 06 55923

(51) Int. Cl.
*H04B 1/00* (2006.01)
(52) U.S. Cl. ........................................ 375/130; 375/260
(58) Field of Classification Search .................. 375/130
See application file for complete search history.

(56) References Cited

U.S. PATENT DOCUMENTS

| 7,933,307 B2* | 4/2011 | Rjeily et al. | 375/130 |
| 2004/0202256 A1* | 10/2004 | Giannakis et al. | 375/267 |
| 2008/0019398 A1* | 1/2008 | Genossar et al. | 370/498 |

OTHER PUBLICATIONS

Chadi Abou-Rjeily, et al., "A 2×2 Antennas Ultra-Wideband System with Biorthogonal Pulse Position Modulation", IEEE Communications Letters, vol. 10, No. 5, XP-002450772, May 5, 2006, pp. 366-368.

(Continued)

*Primary Examiner* — David C. Payne
*Assistant Examiner* — Erin File
(74) *Attorney, Agent, or Firm* — Oblon, Spivak, McClelland, Maier & Neustadt, L.L.P.

(57) ABSTRACT

The invention relates to a space-time coding method for a UWB transmission system comprising a plurality of radiative elements, said method coding a block of information symbols $S=(\sigma_1, \sigma_2, \ldots, \sigma_P)$ belonging to a PPM modulation alphabet, into a sequence of vectors, the components of a vector being intended to position-modulate a UWB pulse signal for a given radiative element of said system and a given transmission channel use, each component corresponding to a PPM modulation position, in which said vectors are obtained from the elements of the matrix:

Figure 1:
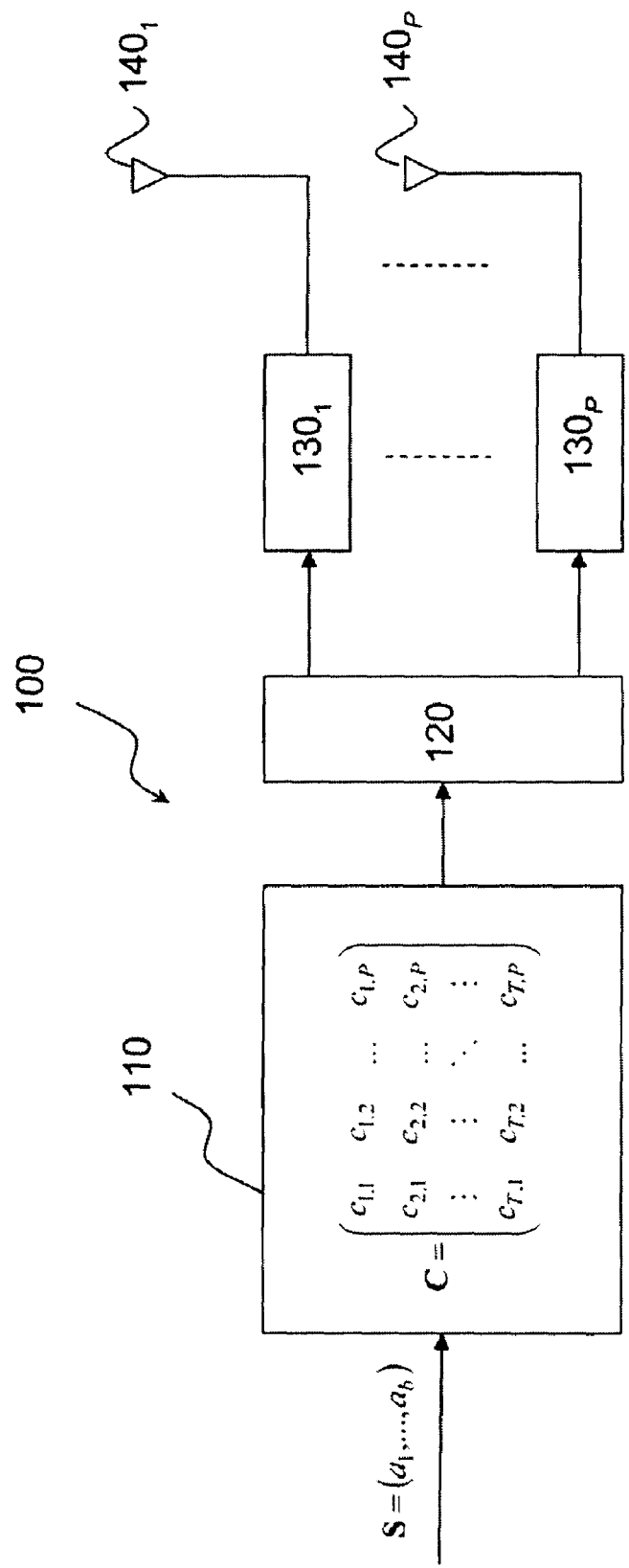

$$C = \begin{pmatrix} \sigma_1 & \sigma_2 & \cdots & \sigma_P \\ \Omega\sigma_P & \sigma_1 & \ddots & \vdots \\ \vdots & \ddots & \ddots & \sigma_2 \\ \Omega\sigma_2 & \cdots & \Omega\sigma_P & \sigma_1 \end{pmatrix}$$

a row of the matrix corresponding to a use of the transmission channel and a column of the matrix corresponding to a radiative element, the matrix C being defined to within a permutation of its rows and/or its columns and $\Omega$ carrying out a permutation operation on the PPM modulation positions.

9 Claims, 4 Drawing Sheets

OTHER PUBLICATIONS

W. Pam Siriwongpairat, et al., "Performance Analysis of Time Hopping and Direct Sequence UWB Space-Time Systems", IEEE Communications Society Globecom 2004, XP-010758392, Nov. 29, 2004, pp. 3526-3530.

Fabien Heliot, et al., "Performance of Space-Time Block coding and Space-Time Trellis coding for Impulse Radio", IEEE Communications Society Globecom 2004, XP-010758316, Nov. 29, 2004, pp. 3225-3229.

Siavash M. Alamouti, "A Simple Transmit Diversity Technique for Wireless Communications", IEEE Journal on Select Areas in Communications, vol. 16, No. 8, Oct. 1998, pp. 1451-1458.

Vahid Tarokh, et al., "Space-Time Block Codes from Orthogonal Designs", IEEE Transactions on Information Theory, vol. 45, No. 5, Jul. 1999, pp. 1456-1467.

Chadi Abou-Rjeily, et al., "MIMO UWB Communications Using Modified Hermite Pulses", The 17th Annual IEEE International Symposium on Personal, Indoor and Mobile Radio Communications (PIMRC'06), 5 pages.

U.S. Appl. No. 12/863,990, filed Jul. 29, 2010, Abou Rjeily.
U.S. Appl. No. 12/443,919, filed Apr. 1, 2009, Abou Rjeily.
U.S. Appl. No. 12/444,016, filed Apr. 2, 2009, Abou Rjeily.

* cited by examiner

SPACE-TIME CODING METHOD FOR A MULTI-ANTENNA COMMUNICATION SYSTEM OF THE UWB PULSE TYPE

TECHNICAL FIELD

The present invention relates to both the field of Ultra Wide Band (UWB) telecommunications and that of multi-antenna systems with Space Time Coding (STC).

STATE OF THE PRIOR ART

Wireless telecommunications systems of the multi-antenna type are well known in the state of the art. These systems use a plurality of antennas upon emission and/or upon reception and are designated depending on the type of adopted configuration, as MIMO (Multiple Input Multiple Output), MISO (Multiple Input Single Output) or SIMO (Single Input Multiple Output). Subsequently we shall use the same term MIMO for covering the aforementioned alternatives MIMO and MISO. By utilizing spatial diversity upon emission and/or upon reception, these systems are able to provide significantly larger channel capacities than those of conventional mono-antenna (or SISO for Single Input Single Output) systems. This spatial diversity is generally completed by time diversity by means of space-time coding. In such a coding, an information symbol to be transmitted is coded over several antennas and several transmission instants. Two large categories of space-time coding MIMO systems are known: Space Time Trellis Coding (STTC) systems and Space Time Block Coding (STBC) systems. In a trellis coding system, the space-time coder may be considered as a finite state machine providing P transmission symbols to the P antennas depending on the current state and on the information symbol to be coded. Decoding upon reception is carried out by a multi-dimensional Viterbi algorithm, the complexity of which increases exponentially depending on the number of states. In a block coding system, a block of information symbols to be transmitted is coded in a transmission symbol matrix, one dimension of the matrix corresponding to the number of antennas and the other one corresponding to the consecutive transmission instants.

FIG. 1 schematically illustrates a MIMO transmission system 100 with STBC coding. A block of information symbols $S=(\sigma_1, \ldots, \sigma_b)$, for example a binary word of b bits or more generally of b M-ary symbols is coded in a space-time matrix:

$$C = \begin{pmatrix} c_{1,1} & c_{1,2} & \cdots & c_{1,P} \\ c_{2,1} & c_{2,2} & \cdots & c_{2,P} \\ \vdots & \vdots & \ddots & \vdots \\ c_{T,1} & c_{T,2} & \cdots & c_{T,P} \end{pmatrix} \qquad (1)$$

wherein the coefficients $c_{t,p}$, $t=1,\ldots,T$; $p=1,\ldots,P$ of the code as a rule are complex coefficients depending on information symbols, P is the number of antennas used upon emission, T is an integer indicating the time extension of the code, i.e. the number of uses of the channel or PCUs (Per Channel Use).

The function $f$ which establishes a correspondence between any vector S of information symbols and the space-time code word C, is called a coding function. If the function $f$ is linear, it is stated that the space-time code is linear. If the coefficients $c_{t,p}$ are real, the space-time code is said to be real.

In FIG. 1, a space-time coder is designated by 110. At each instant of channel use t, the coder provides the multiplexer 120 with the t-$^{th}$ line vector of the matrix C. The multiplexer transmits to the modulators 130$_1$, ..., 130$_P$ the coefficients of the line vector and the modulated signals are transmitted by the antennas 140$_1$, ..., 140$_P$.

The space-time code is characterized by its rate, i.e. by the number of information symbols which it transmits per instant of channel use (PCU). The code is said to be a full rate code if it is P times higher than the rate relative to mono-antenna use (SISO).

The space-time code is further characterized by its diversity which may be defined as the rank of the matrix C. Maximum diversity will be obtained if for any two code words $C_1$ and $C_2$ corresponding to two vectors $S_1$ and $S_2$, the matrix $C_1-C_2$ is of full rank.

The space-time code is finally characterized by its coding gain which expresses the minimum distance between different words of the code. It may be defined as:

$$\min_{C_1 \neq C_2} \det((C_1 - C_2)^H (C_1 - C_2)) \qquad (2)$$

or, equivalently by a linear code:

$$\min_{C \neq 0} \det(C^H C) \qquad (3)$$

wherein det(C) refers to the determinant C and $C^H$ is the transpose conjugate matrix of C. For a transmission energy per information symbol, the coding gain is limited.

A space-time code will be all the more resistant to fading since its coding gain will be high.

An example of space-time coding for a MIMO system with two transmission antennas was proposed in the article of S. M. Alamouti entitled <<A transmit diversity technique for wireless communications>>, published in the IEEE Journal on selected areas in communications, Vol. 16, pp. 1451-1458, October 1998. The Alamouti code is defined by the space-time 2×2 matrix:

$$C = \begin{pmatrix} \sigma_1 & \sigma_2 \\ -\sigma_2^* & \sigma_1^* \end{pmatrix} \qquad (4)$$

wherein $\sigma_1$ and $\sigma_2$ are two information symbols to be transmitted $\sigma_1^*$ and $\sigma_2^*$ their respective conjugates. As this may be seen in expression (4), this code transmits two information symbols for two channel uses and its rate is therefore of one symbol/PCU.

Although initially presented in the aforementioned article for symbols belonging to QAM modulation, the Alamouti code also applies to information symbols belonging to PAM or PSK modulation. On the other hand it cannot be easily extended to position modulation, also called PPM (Pulse Position Modulation). The symbol of a PPM modulation alphabet with M positions may be represented by a vector with M components all zero except one equal to 1, corresponding to the modulation position at which a pulse is emitted. The use of PPM symbols in the expression (4) then leads to a space-time matrix of size 2M×2. The term $-\sigma_2^*$ appearing in the matrix is not a PPM symbol and requires the transmission of a pulse modified by a change of sign. In other words, this amounts to using signed PPM symbols, belonging to an extension of the PPM modulation alphabet.

More generally, the use of PPM symbols in space-time codes, notably those defined by V. Tarokh et al. in the article entitled <<Space-time block codes from orthogonal designs>> published in the IEEE Trans. on Information Theory, Vol. 45, No. 5, July 1999, pp. 1456-1567, lead to an extension of the PPM modulation alphabet.

Another field of telecommunications is presently the subject of considerable research. The subject is UWB telecommunications systems, notably anticipated for developing future wireless personal area networks (WPAN). These systems have the specificity of directly operating in a baseband with very wide bandwidth signals. By UWB signal is generally meant a signal complying with the spectral mask as stipulated in the FCC regulation dated Feb. 14, 2002 and revised in March 2005, i.e. essentially, a signal in the spectral band from 3.1 to 10.6 GHz and having a bandwidth of at least 500 MHz at −10 dB. In practice, two types of UWB signals are known, multi-band OFDM (MB-OFDM) signals and UWB pulse type signals. In the following we will only be interested in the latter.

A UWB pulse-signal consists of very short pulses, typically of the order of a few hundred picoseconds, distributed within a frame. In order to reduce Multiple Access Interference (MAI), a distinct Time Hopping (TH) code is assigned to every user. The signal from or to a user k may then be written as:

$$s_k(t) = \sum_{n=0}^{N_s-1} w(t - nT_s - c_k(n)T_c) \qquad (5)$$

wherein w is the shape of the elementary pulse, $T_c$ is a symbol fraction time (or chip), $T_s$ is the duration of an elementary interval with $N_s = N_c T_c$ wherein $N_c$ is the number of chips in an interval, the total frame having a duration of $T_f = N_s T_s$ wherein $N_s$ is the number of intervals in the frame. The elementary pulse duration is selected to be less than the chip duration, i.e. $T_w \leq T_c$. The sequence $c_k(n)$ for $n=0, \ldots, N_s-1$ defines the time hopping code of the user k. The time hopping sequences are selected to as to minimize the number of collisions between pulses belonging to time hopping sequences of different users.

Figure 2A:
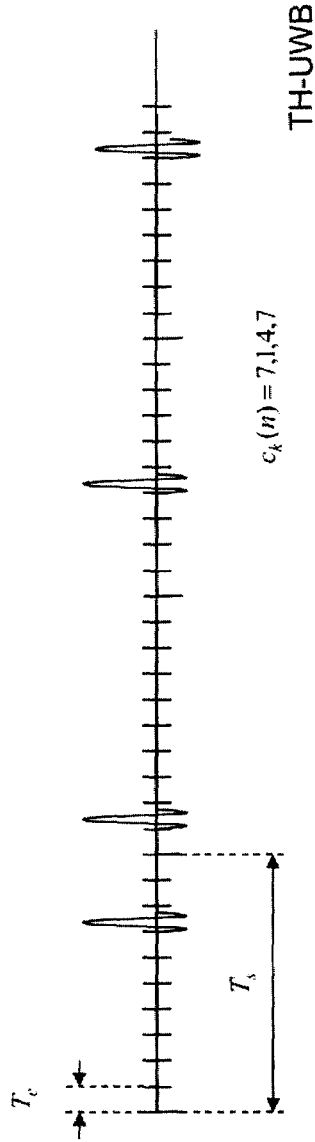

In FIG. 2A, a TH-UWB signal associated with a user k is illustrated. In order to transmit an given information symbol from or to a user k, the TH-UWB signal is generally modulated with position modulation, i.e. for the modulated signal:

$$s_k(t) = \sum_{n=0}^{N_s-1} w(t - nT_s - c_k(n)T_c - \mu_k \varepsilon) \qquad (6)$$

wherein ε is a modulation delay time (dither) substantially less than the chip duration and $\mu_k \in \{0, \ldots, M-1\}$ is the PPM M-ary position of the symbol.

Figure 2B:
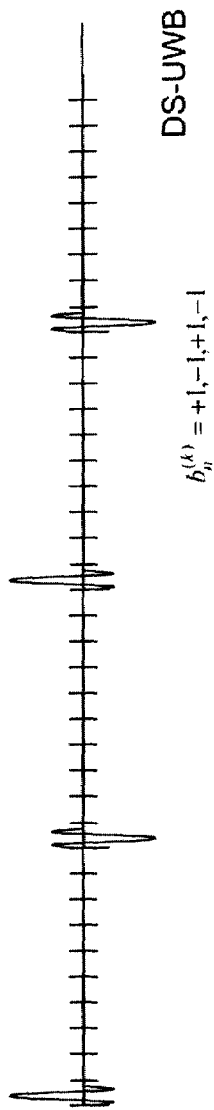

Instead of separating the different users by means of time hopping codes, it is also possible to separate them by orthogonal codes, for example Hadamard codes, as in DS-CDMA. The term then used is DS-UWB (Direct Spread UWB). In this case, the expression of the non-modulated signal corresponding to (5) is:

$$s_k(t) = \sum_{n=0}^{N_s-1} b_n^{(k)} w(t - nT_s) \qquad (7)$$

wherein $b_n^{(k)}$, $n=0, \ldots, N_s-1$ is the spread sequence of user k. It is noted that the expression (7) is analogous to that of conventional DS-CDMA, however it differs therefrom by the fact that the chips do not occupy the whole frame but are distributed with period $T_s$. A DS-UWB signal associated with a user k is illustrated in FIG. 2B.

As earlier, the information symbol may be transmitted by means of PPM modulation. The DS-UWB position-modulated signal corresponding to the TH-UWB (6) may be expressed as, while retaining the same notations:

$$s_k(t) = \sum_{n=0}^{N_s-1} b_n^{(k)} \cdot w(t - nT_s - \mu_k \varepsilon) \qquad (8)$$

Finally, the combination of time hopping codes and spectral spread codes is known in order to provide multiple accesses to different users. A TH-DS-UWB pulse UWB signal is thus obtained with the general form:

$$s_k(t) = \sum_{n=0}^{N_s-1} b_n^{(k)} \cdot w(t - nT_s - c_k(n)T_c) \qquad (9)$$

Figure 2C:
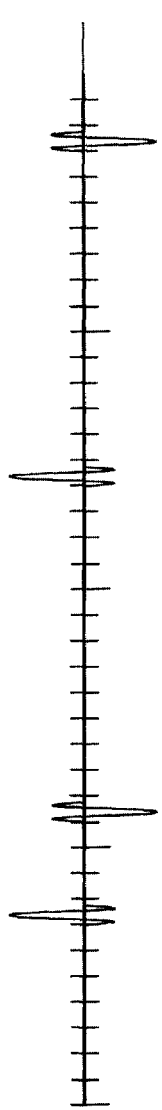

A TH-DS-UWB signal associated with its user k is illustrated in FIG. 2C. This signal may be modulated by position modulation. The modulated signal is then obtained as:

$$s_k(t) = \sum_{n=0}^{N_s-1} \sum_{m=0}^{M-1} b_n^{(k)} \cdot w(t - nT_s - c_k(n)T_c - \mu_k \varepsilon) \qquad (10)$$

It is known from the state of the art how to use UWB signals in MIMO systems. In this case, each antenna transmits a UWB signal modulated as a function of an information symbol or of a block of such symbols (STBC). However, as this was seen earlier, the use of PPM information symbols in space-time does require the use of signed pulses, i.e. resorting to an extended 2-PAM-M-PPM modulation alphabet. Taking into account phase inversion further assumes a more complex RF architecture upon emission and reception than that of a conventional pulse system. Finally, certain UWB systems do not lend themselves or only poorly to signed pulse transmission. For example optical UWB systems only transmit light intensity TH-UWB signals, necessarily lacking sign information.

The object of the present invention is to propose a particularly simple and robust coding method for a multiple antenna UWB system. While using position-modulation, the coding method according to the present invention does not require an extension of the modulation alphabet. In particular with this coding method, it is possible not to resort to the transmission of signed pulses when the modulation support signal is of the TH-UWB type.

DISCUSSION OF THE INVENTION

The present invention is defined by a space-time coding method for a UWB transmission system comprising a plurality of radiative elements, said method coding a block of information symbols $S = (\sigma_1, \sigma_2, \ldots, \sigma_P)$ belonging to a PPM modulation alphabet, into a sequence of vectors, the components of a vector being intended to position-modulate a UWB pulse signal for a given radiative element of said system and a given transmission channel use, each component corresponding to a PPM modulation position. According to this method, said vectors are obtained from the elements of the matrix:

$$C = \begin{pmatrix} \sigma_1 & \sigma_2 & \ldots & \sigma_P \\ \Omega\sigma_P & \sigma_1 & \ddots & \vdots \\ \vdots & \ddots & \ddots & \sigma_2 \\ \Omega\sigma_2 & \ldots & \Omega\sigma_P & \sigma_1 \end{pmatrix}$$

a row of the matrix corresponding to the use of a transmission channel and a column of the matrix corresponding to a radiative element, the matrix C being defined to within a permutation of its rows and/or its columns and Ω being a permutation of the PPM modulation positions.

The permutation Ω may be a circular permutation of said modulation positions, for example a circular shift of these positions.

Advantageously, the radiative elements are UWB antennas or laser diodes or even light-emitting diodes.

Said pulse signal may be a TH-UWB signal, a DS-UWB or even a TH-DS-UWB signal.

The present invention is also defined by a UWB transmission system comprising a plurality of radiative elements and:
 coding means for coding a block of information symbols $S=(\sigma_1, \sigma_2, \ldots, \sigma_P)$ belonging to a PPM modification alphabet, into a sequence of vectors, each vector being associated with a given use of a transmission channel and a given radiative element, each component of a vector corresponding to a PPM modulation position, said vectors being obtained from elements of the matrix $$C = \begin{pmatrix} \sigma_1 & \sigma_2 & \ldots & \sigma_P \\ \Omega\sigma_P & \sigma_1 & \ddots & \vdots \\ \vdots & \ddots & \ddots & \sigma_2 \\ \Omega\sigma_2 & \ldots & \Omega\sigma_P & \sigma_1 \end{pmatrix}$$

a row of matrix corresponding to the use of the transmission channel and a column of the matrix corresponding to a radiative element. The matrix C being defined to within a permutation of its rows and/or of its columns and Ω being a permutation of the PPM modulation positions;
 a plurality of modulators in order to position-modulate an UWB pulse signal, each modulator being associated with a radiative element and position-modulating said signal during use of the transmission channel, by means of the components of the vector associated with said radiative element and with said use of the channel;
 each radiative element being adapted so as to emit the signal thereby modulated by said associated modulator.

SHORT DESCRIPTION OF THE DRAWINGS

Figure 3:
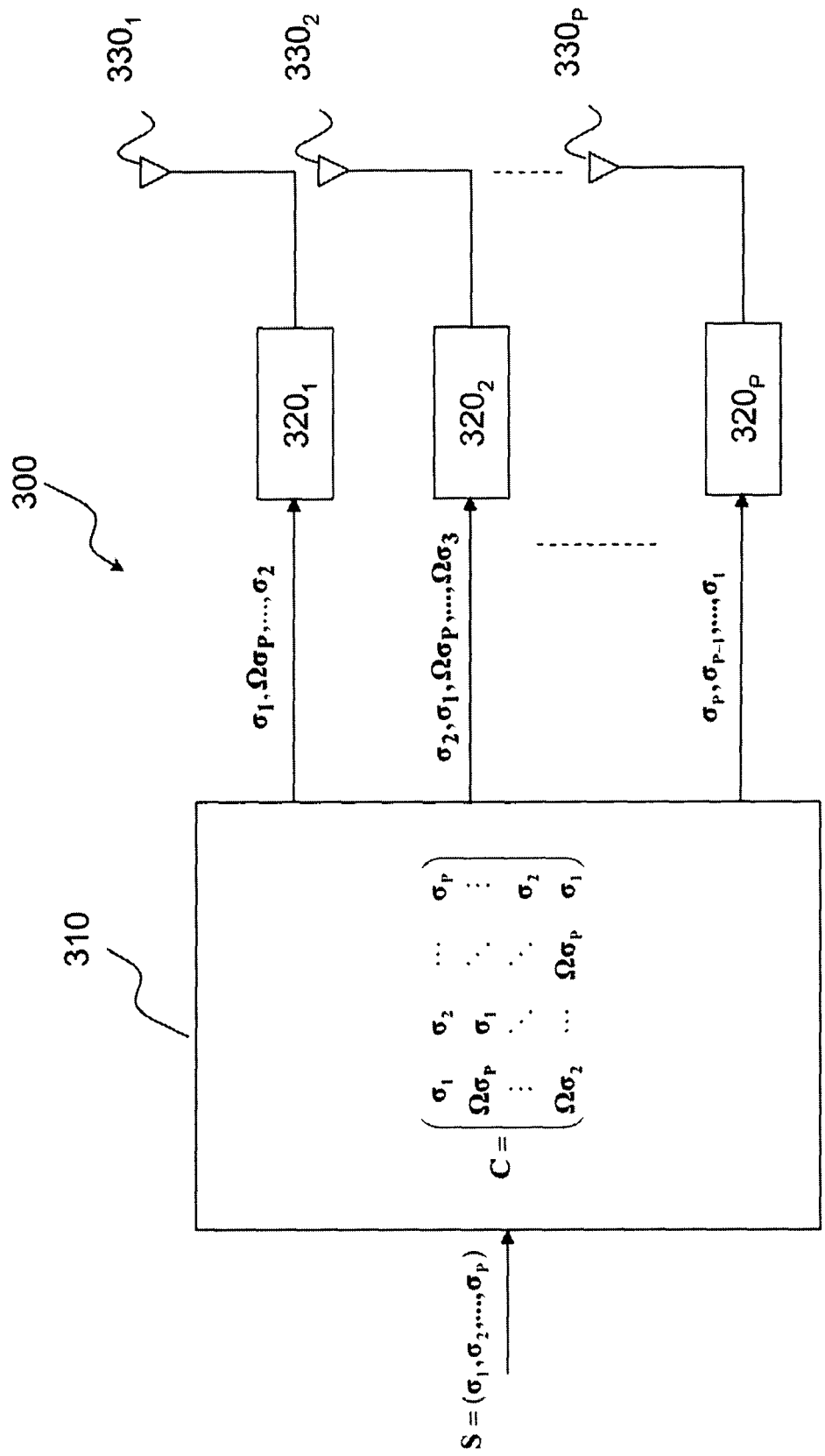
Figure 4:
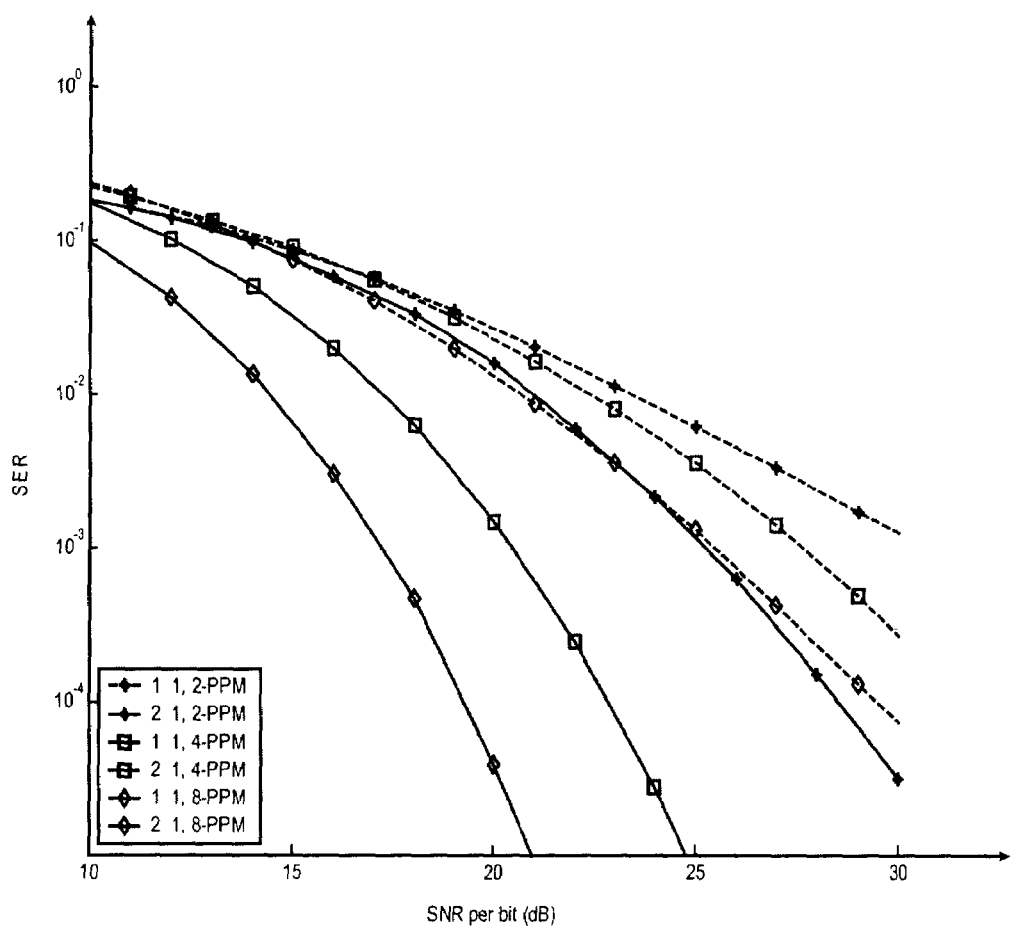

Other characteristics and advantages of the invention will become apparent upon reading a preferential embodiment of the invention made with reference to the appended figures wherein:

FIG. 1 schematically illustrates a MIMO transmission system with STBC coding known from the state of the art;

FIGS. 2A-2C illustrate the respective shapes of the TH-UWB, DS-UWB and TH-DS-UWB signals;

FIG. 3 schematically illustrates a multi-antenna UWB transmission system in accordance with an embodiment according to the invention;

FIG. 4 illustrates binary error rate curves versus the signal-to-noise ratio upon reception, for the coding method according to the invention.

DETAILED DISCUSSION OF PARTICULAR EMBODIMENTS

The idea at the basis of the invention is to introduce coding diversity by means of permutation operator acting on the modulation positions of the information symbols.

An UWB transmission system with P transmission antennas and more generally, as this will be seen later on, with P radiative elements, will be considered in the following. The information symbols belong to a position modulation alphabet. As earlier, M designates the cardinality of this alphabet. The space-time code used by the systems is defined by the following matrix, of dimensions PM×P:

$$C = \begin{pmatrix} \sigma_1 & \sigma_2 & \ldots & \sigma_P \\ \Omega\sigma_P & \sigma_1 & \ddots & \vdots \\ \vdots & \ddots & \ddots & \sigma_2 \\ \Omega\sigma_2 & \ldots & \Omega\sigma_P & \sigma_1 \end{pmatrix} \quad (11)$$

wherein $\sigma_1, \sigma_2, \ldots, \sigma_P$ are information symbols to be transmitted, illustrated as column vectors of dimension M, the components of which are all zero except for one of them, equal to 1, defining the modulation position.

Generally, any permutation on the rows (by row is meant here a row of vectors) and/or on the columns of C is a space-time code according to the invention, a permutation on the rows being equivalent to a permutation of the instants of use of the channel and a permutation on the columns being equivalent to a permutation of the transmission antennas.

The matrix Ω is a permutation matrix of size M×M operating on the modulation positions. Any one-to-one correspondence of the set of modulation positions on itself, except the identity, is called an Ω permutation. The permutation matrix may notably be a circular permutation matrix, for example of a simple circular shift:

$$\Omega = \begin{pmatrix} 0_{1 \times M-1} & 1 \\ I_{M-1 \times M-1} & 0_{M-1 \times 1} \end{pmatrix} = \begin{pmatrix} 0 & 0 & \ldots & 0 & 1 \\ 1 & 0 & \ldots & 0 & 0 \\ 0 & 1 & 0 & \ddots & \vdots \\ \vdots & \ddots & \ddots & \ddots & 0 \\ 0 & \ldots & 0 & 1 & 0 \end{pmatrix} \quad (12)$$

wherein $I_{M-1 \times M-1}$ is the identity matrix of size M−1, $0_{1 \times M-1}$ is a zero line vector of size M−1, $0_{M-1 \times 1}$ the zero column vector of size M−1.

As an illustration, the form of the space-time matrix (11) may be explicited in the case when the matrix Ω is that of a circular shift (12):

$$C = \begin{pmatrix} \sigma_{1,0} & \sigma_{2,0} & \cdots & \sigma_{P,0} \\ \sigma_{1,1} & \sigma_{2,1} & \cdots & \sigma_{P,1} \\ \vdots & \vdots & \cdots & \vdots \\ \sigma_{1,M-1} & \sigma_{2,M-1} & \cdots & \sigma_{P,M-1} \\ \sigma_{P,M-1} & \sigma_{1,0} & \ddots & \vdots \\ \sigma_{P,0} & \sigma_{1,1} & \ddots & \vdots \\ \vdots & \vdots & \ddots & \vdots \\ \sigma_{P,M-2} & \sigma_{1,M-1} & \ddots & \vdots \\ \vdots & & \ddots & \sigma_{2,0} \\ \vdots & & \ddots & \sigma_{2,1} \\ \vdots & & \ddots & \vdots \\ \vdots & & \ddots & \sigma_{2,M-1} \\ \sigma_{2,M-1} & \cdots & \sigma_{P,M-1} & \sigma_{1,0} \\ \sigma_{2,0} & \cdots & \sigma_{P,0} & \sigma_{1,1} \\ \vdots & \cdots & \vdots & \vdots \\ \sigma_{2,M-2} & \cdots & \sigma_{P,M-2} & \sigma_{1,M-1} \end{pmatrix} \quad (13)$$

wherein $\sigma_l = (\sigma_{l,0}\ \sigma_{l,1}\ \ldots\ \sigma_{l,M-1})^T$, $l=1, \ldots, P$ with $\sigma_{l,m} = \delta(m - \mu_l)$ wherein $\mu_l$ is the relative modulation position to the symbol $\sigma_l$ and $\delta$ is Dirac's symbol.

Let us now consider the case when the system is a bi-antenna (P=2) and when the matrix $\Omega$ is any permutation. It will further be assumed that the system uses a TH-UWB signal, as defined in (5). The space-time code modulates this signal and is transmitted during two consecutive uses of the channel (PCU). During the first use, the antenna 1 transmits a first frame, i.e. using the notations of (6):

$$s^1(t) = \sum_{n=0}^{N_s-1} \sum_{m=0}^{M-1} \sigma_{1,m} w(t - nT_s - c(n)T_c - m\varepsilon) \quad (14)$$

$$= \sum_{n=0}^{N_s-1} w(t - nT_s - c(n)T_c - \mu_1 \varepsilon)$$

and the antenna 2 transmits a first frame simultaneously:

$$s^2(t) = \sum_{n=0}^{N_s-1} \sum_{m=0}^{M-1} \sigma_{2,m} w(t - nT_s - c(n)T_c - m\varepsilon) \quad (15)$$

$$= \sum_{n=0}^{N_s-1} w(t - nT_s - c(n)T_c - \mu_2 \varepsilon)$$

During the second use of the channel, the antenna 1 transmits a second frame:

$$s^1(t) = \sum_{n=0}^{N_s-1} \sum_{m=0}^{M-1} \sigma_{2,\omega(m)} w(t - nT_s - c(n)T_c - m\varepsilon) \quad (16)$$

$$= \sum_{n=0}^{N_s-1} w(t - nT_s - c(n)T_c - \Omega(\mu_2)\varepsilon)$$

wherein $\omega = \Omega^{-1}$ is a permutation of the set $\{0, 1, \ldots, M-1\}$ and the antenna 2 transmits a second frame simultaneously:

$$s^2(t) = \sum_{n=0}^{N_s-1} \sum_{m=0}^{M-1} \sigma_{1,m} w(t - nT_s - c(n)T_c - m\varepsilon) \quad (17)$$

$$= \sum_{n=0}^{N_s-1} w(t - nT_s - c(n)T_c - \mu_1 \varepsilon)$$

It is clear for one skilled in the art that similar expressions would be obtained by using a DS-UWB signal according to expression (7) or even a DS-TH-UWB signal according to expression (9) instead of a TH-UWB signal.

As this may be seen from (11) or (13), the components of the matrix C are simply 0s and 1s and not signed values. Therefore these components neither introduce any phase inversion nor generally any phase lag. This space-time code lends itself well to the modulation of an ultra-wide band signal.

Further, the matrix C has the same number of «1s» in each of its columns, which is expressed by advantageous equidistribution of energy over the various antennas.

The space-time code C is also a full rate code since P information symbols are transmitted during P uses of the channel. Its coding gain is therefore higher than that of those known in the prior art.

Finally, the proposed space-time code is with maximum diversity. This is easily shown in the case of two transmission antennas (P=2). Indeed, in this case, the space-time code matrix is written as:

$$C = \begin{pmatrix} \sigma_1 & \sigma_2 \\ \Omega \sigma_2 & \sigma_1 \end{pmatrix} \quad (18)$$

By definition, the code is with maximum diversity if for any pair of distinct matrices C,C' of the code, $\Delta C = C - C'$ is of full rank, i.e. if:

$$\Delta C = \begin{pmatrix} a_1 & a_2 \\ \Omega a_2 & a_1 \end{pmatrix} \quad (19)$$

wherein $a_1 = \sigma_1 - \sigma'_1$ and $a_2 = \sigma_2 - \sigma'_2$, is of full rank.

By design, the vectors $a_1$ and $a_2$ either have all their components zero or two non-zero components with opposite signs.

The matrix $\Delta C$ may be written in its developed form:

$$\Delta C = \begin{pmatrix} a_{1,0} & a_{2,0} \\ \vdots & \vdots \\ a_{1,M-1} & a_{2,M-1} \\ a_{2,\omega(0)} & a_{1,0} \\ \vdots & \vdots \\ a_{2,\omega(M-1)} & a_{1,M-1} \end{pmatrix} \quad (20)$$

with $\omega = \Omega^{-1}$ and $a_{l,m} = \sigma_{l,m} - \sigma'_{l,m}$, $l=1, 2$, $m=0, \ldots, M-1$.

The matrix $\Delta C$ is not of full rank if both of these column vectors are colinear, i.e. if there exists a scalar $\lambda$, such that:

$$a_{1,m} = \lambda a_{2,m} \text{ and } a_{2,\omega(m)} = \lambda a_{1,m} \quad (21)$$

which, taking into account the fact that $a_{l,m} \in \{-1, 0, 1\}$ and therefore $\lambda^2 = 1$, is verified if and only if:

$$a_{l,m} = a_{1,\Omega(m)} \text{ and } a_{2,m} = a_{2,\omega(m)} \quad (22)$$

in other words the vectors $a_1$ and $a_2$ are necessarily zero, i.e. C=C'.

FIG. 3 illustrates an exemplary transmission system using the space-time coding according to the invention.

The system 300 receives information symbols blockwise $S = (\sigma_1, \sigma_2, \ldots, \sigma_P)$ wherein the $\sigma_l$, $l=1, \ldots, P$ with P>1 are symbols of a PPM constellation of cardinality M >1. Alternatively, the information symbols may stem from another M-ary constellation provided that they are subject beforehand to transcoding (mapping) in said PPM constellation. The information symbols may be issued from one or a plurality of operations well known to one skilled in the art such as source coding, channel coding of the convolution type, blockwise, or else further series or parallel turbocoding, interlacing, etc.

The information symbol block $S=(\sigma_1, \sigma_2, \ldots, \sigma_P)$ undergoes a coding operation in the space-time coder 310. More specifically, the module 310 calculates the coefficients of the matrix C according to expression (11) or an alternative obtained by permutation of its lines and/or its columns as indicated earlier. The P column vectors (vectors with M components) of the first line of C, representing P PPM symbols, are respectively transmitted to the modulators UWB $320_1, \ldots, 320_P$ in order to generate the first frame, and then the P column vectors of the second line C, for generating the second frame etc., right up to the last line of column vectors for generating the last frame. In FIG. 4, the upper index indicates the frame and the lower index the radiative element $330_1, \ldots, 330_P$. The modulator UWB $320_1$ generates from column vectors $\sigma_1, \Omega\sigma_P, \Omega\sigma_{P-1} \ldots, \sigma_2$, the corresponding modulated UWB pulse signals. Also, the modulator UWB $320_2$ generates from the vectors $\sigma_2, \sigma_1, \Omega\sigma_P, \ldots, \Omega\sigma_3$ the corresponding modulating UWB pulse signals, and so forth up to the modulator UWB $320_P$ from the vectors $\sigma_P, \sigma_{P-1}, \ldots, \sigma_1$. For example, if, for a bi-antenna system (P=2), the space-time coding matrix (18) and a modulation support signal of the TH-UWB type are used, the modulator $320_1$ will successively provide the signals (14) and (16) while the modulator UWB $320_2$ will successively provide the signals (15) and (17). Although less advantageous within the scope of the present invention, the UWB pulse signals used as support for the modulation may alternatively be of the type DS-UWB or TH-DS-UWB. In all cases, the thereby modulated UWB pulse signals are then transmitted to the radiative elements $330_1$ to $330_P$. These radiative elements may be UWB antennas or laser diodes or LEDs, for example operating in the infrared domain, associated with electro-optical modulators. The proposed transmission system may then be used in the field of wireless optical communications.

The UWB signals transmitted by the system illustrated in FIG. 3 may be processed by a multi-antenna receiver in a conventional way. The receiver for example may comprise a correlation stage of the Rake type followed by a decision stage, for example using a sphere decoder known to one skilled in the art.

FIG. 4 illustrates the binary error rate curves versus the signal-to-noise ratio per bit upon reception. The curves are given for different configurations of systems, with one or two transmission antennas and one receiving antenna, and for different PPM modulation orders: 2, 4 and 8 positions.

The processing upon reception is based on a sphere decoding technique adapted to PPM modulations, as described in the article of C. Abou-Rjeily et al. entitled <<MIMO UWB communication systems using modified Hermite pulses>> published in Proc. of the 17$^{th}$ IEEE Annual International Symposium on Personal, Indoor and Mobile Radio Communications, September 2006. It should be noted that for P=2 transmission antennas, the space-time coding according to the invention and the Alamouti code have the same performances. However, as this was stated, the coding according to the invention does not require an extension of the PPM constellation.

The invention claimed is:

1. A space-time coding method for an ultra-wide band (UWB) transmission system including a plurality of radiative elements, said method comprising:
coding a block of information symbols $S=(\sigma_1,\sigma_2,\ldots,\sigma_P)$ belonging to a pulse position modulation (PPM) alphabet, into a sequence of vectors, components of a vector of said sequence position-modulating a UWB pulse signal for a given radiative element of said system and a given use of a transmission channel, each component corresponding to a PPM modulation position,
wherein said vectors are obtained from the elements of matrix $$C = \begin{pmatrix} \sigma_1 & \sigma_2 & \cdots & \sigma_P \\ \Omega\sigma_P & \sigma_1 & \ddots & \vdots \\ \vdots & \ddots & \ddots & \sigma_2 \\ \Omega\sigma_2 & \cdots & \Omega\sigma_P & \sigma_1 \end{pmatrix}$$

wherein a row of the matrix C corresponds to a use of the transmission channel and a column of the matrix C corresponds to a radiative element, the matrix C being defined to within a permutation of its rows and/or its columns and $\Omega$ being a permutation of the PPM modulation positions.

2. The space-coding method according to claim 1, wherein $\Omega$ is a circular permutation of said modulation position.

3. The space-coding method according to claim 2, wherein $\Omega$ is a circular shift of said modulation positions.

4. The transmission method according to claim 1, wherein the radiative elements are UWB antennas.

5. The transmission method according to claim 1, wherein the radiative elements are laser diodes or light-emitting diodes.

6. The method according to claim 4, wherein said pulse signal is a Time-Hopping UWB (TH-UWB) signal.

7. The method according to claim 4, wherein said pulse signal is a Direct Spread UWB (DS-UWB) signal.

8. The method according to claim 4, wherein said pulse signal is a Time-Hopping Direct Spread UWB (TH-DS-UWB) signal.

9. An ultra-wide band (UWB) transmission system comprising:
a plurality of radiative elements;
coding means for coding a block of information symbols $S=(\sigma_1, \sigma_2, \ldots, \sigma_P)$ belonging to a pulse position modulation (PPM) alphabet, into a sequence of vectors, each vector of said sequence being associated with a given use of a transmission channel and a given radiative element, each component of a vector of said sequence corresponding to a PPM modulation position, said vectors being obtained from the elements of matrix $$C = \begin{pmatrix} \sigma_1 & \sigma_2 & \cdots & \sigma_P \\ \Omega\sigma_P & \sigma_1 & \ddots & \vdots \\ \vdots & \ddots & \ddots & \sigma_2 \\ \Omega\sigma_2 & \cdots & \Omega\sigma_P & \sigma_1 \end{pmatrix}$$

wherein a row of the matrix C corresponds to a use of the transmission channel and a column of the matrix C corresponds to a radiative element, the matrix C being defined to within a permutation of its rows and/or its columns and $\Omega$ being a permutation of the PPM modulation positions;
a plurality of modulators for position-modulating a UWB pulse signal, each modulator being associated with a radiative element and position-modulating said signal, during a use of the transmission channel, by components of a vector associated with said radiative element and with said use of the channel; and
each radiative element being adapted for emitting the signal thereby modulated by said associated modulator.

* * * * *